(12) United States Patent
Nakamura (10) Patent No.: US 8,321,081 B2
(45) Date of Patent: Nov. 27, 2012

(54) PLUG-IN VEHICLE MANAGEMENT SYSTEM

(75) Inventor: Kazuo Nakamura, Obu (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 299 days.

(21) Appl. No.: 12/702,519

(22) Filed: Feb. 9, 2010

(65) Prior Publication Data

US 2010/0204865 A1  Aug. 12, 2010

(30) Foreign Application Priority Data

Feb. 9, 2009  (JP) .................................. 2009-27317

(51) Int. Cl.
*B60L 9/00*  (2006.01)
(52) U.S. Cl. .......................................... 701/22; 701/36
(58) Field of Classification Search ............. 340/426.18, 340/426.22, 426.23
See application file for complete search history.

(56) References Cited

U.S. PATENT DOCUMENTS

| 4,305,070 | A | * | 12/1981 | Samuel | 340/691.8 |
|---|---|---|---|---|---|
| 5,202,617 | A | * | 4/1993 | Nor | 320/130 |
| 5,548,200 | A | * | 8/1996 | Nor et al. | 320/109 |
| 5,596,261 | A | * | 1/1997 | Suyama | 320/152 |
| 5,612,668 | A | * | 3/1997 | Scott | 340/426.13 |
| 5,734,330 | A | * | 3/1998 | Nakamura | 340/5.22 |
| 5,844,495 | A | * | 12/1998 | Griessbach | 340/5.26 |
| 6,542,076 | B1 | * | 4/2003 | Joao | 340/539.14 |
| 6,614,204 | B2 | * | 9/2003 | Pellegrino et al. | 320/109 |
| 6,816,090 | B2 | * | 11/2004 | Teckchandani et al. | 340/989 |
| 7,081,813 | B2 | * | 7/2006 | Winick et al. | 340/521 |
| 7,116,247 | B2 | * | 10/2006 | Fujiwara et al. | 340/932.2 |
| 7,397,363 | B2 | * | 7/2008 | Joao | 340/539.11 |
| 7,737,829 | B2 | * | 6/2010 | Nishiyama | 340/425.5 |
| 2009/0043450 | A1 | * | 2/2009 | Tonegawa et al. | 701/36 |

FOREIGN PATENT DOCUMENTS

| EP | 2 058 916 | 5/2009 |
|---|---|---|
| JP | 61-191944 | 11/1986 |
| JP | 2000-40196 | 2/2000 |
| JP | 2002-185583 | 6/2002 |

(Continued)

OTHER PUBLICATIONS

Rawson et al., Electric Vehicle Charging Equipement Design and Health and Safety Codes, 1998, California Energy Commission (Pertinent Pages: pp. 1-2) [retrieved from www.energy.ca.gov/papers/98-09-23_kateley.pdf on Mar. 21, 2012].*

(Continued)

*Primary Examiner* — Richard M. Camby
(74) *Attorney, Agent, or Firm* — Nixon & Vanderhye PC (57) ABSTRACT

A plug-in vehicle management system enables charging of a plug-in vehicle from a power supply station through an electric power line and power line communication between the power supply station and the vehicle. When a vehicle-side connector and a station-side connector are connected to enable the power-line communication between a vehicle-side power line communication section and a station-side power line communication section, a vehicle-side security control section and a station-side security control section cooperate so that one of a vehicle-side input/output section and a station-side input/output section receives an input signal and transmits it to the other of the vehicle-side input/output section and the station-side input/output section.

3 Claims, 5 Drawing Sheets

FOREIGN PATENT DOCUMENTS

| | | |
|---|---|---|
| JP | 2003-23378 | 1/2003 |
| JP | 2003-023442 | 1/2003 |
| JP | 2004-62690 | 2/2004 |
| JP | 2004-318643 | 11/2004 |
| JP | 2005-227965 | 8/2005 |
| JP | 2005-327019 * | 11/2005 |
| JP | 2007-72686 | 3/2007 |
| JP | 2007-236173 | 9/2007 |
| JP | 2007-246070 | 9/2007 |
| JP | 2008-14099 | 1/2008 |
| JP | 2008-063757 | 3/2008 |
| JP | 2008-222009 | 9/2008 |
| JP | 2008-278740 | 11/2008 |

OTHER PUBLICATIONS

Japanese Office Action dated Feb. 15, 2011, issued in corresponding Japanese Application No. 2009-027317 with English Translation.

* cited by examiner

PLUG-IN VEHICLE MANAGEMENT SYSTEM

CROSS REFERENCE TO RELATED APPLICATION

The present application is based on and incorporates herein by reference Japanese patent application No. 2009-027317 filed on Feb. 9, 2009.

TECHNICAL FIELD

The present invention relates to a plug-in vehicle management system, which enables charging of a vehicle by an electric power line of a power supply station and power line communication between the power supply station and the plug-in vehicle through the power supply line.

BACKGROUND

Various electric vehicles or hybrid vehicles are developed recently as plug-in vehicles so that a storage battery of such vehicles may be charged by a commercial power source available at home for example.

The plug-in vehicle is parked in a parking garage of a home after certain travel and its battery is charged to prepare for a next travel event. According to a power line communication system of an electric vehicle, as disclosed in JP 2003-23378A, the electric vehicle is charged by using a home power supply network. Security of the vehicle needs to be assured while it is being charged. Therefore, it is proposed in JP 2003-23378A to allow the charging only when identification codes (ID) assigned to the electric vehicle and to the power outlet of the power supply network correspond to each other or to issue an alarm by a visual display device if the vehicle is disengaged from the power outlet without releasing a security key.

It is desired, however, that the plug-in vehicle management system provide much higher security or additional application functions.

BRIEF SUMMARY

It is, therefore, an object of the present exemplary embodiment to provide a plug-in vehicle management system, which can enhance security of a plug-in vehicle or a power supply station and provide additional applications for the plug-in vehicle or the power supply station.

According to the present exemplary embodiment, a plug-in vehicle management system is provided to perform charging of a plug-in vehicle by a power supply station through a power supply line, as well as power line communication between the plug-in vehicle and the power supply station through the power supply line.

In a first aspect, the plug-in vehicle is provided with a vehicle-side power line communication section for performing power line communication with the power supply station through the power supply line, and a vehicle-side security control section for controlling a vehicle-side input/output section provided in the plug-in vehicle. The power supply station is provided with a station-side power line communication section for performing the power line communication with the plug-in vehicle through the power supply line, and a station-side security control section for controlling a station-side input/output section provided in the power supply station. The vehicle-side security control section and the station-side security control section are configured to cooperate to receive an input signal at one of the vehicle-side security control section and the station-side security control section, and transmit an output signal to the other of the vehicle-side security control section and the station-side security control section, when the power line communication is performed between the vehicle-side power line communication section and the station-side power line communication section.

In a second aspect, the plug-in vehicle is provided with a vehicle-side power line communication section for performing power line communication with the power supply station through the power supply line, and a vehicle-side security control section connected to the vehicle-side power line communication section. The power supply station is provided with a station-side power line communication section for performing the power line communication with the plug-in vehicle through the power supply line, a station-side security control section connected to the station-side power line communication section, an electronic certification control section provided at a foyer of the power supply station for checking whether an electronic certification key for the plug-in vehicle is an authorized one, and an electrically-driven lock provided at the foyer of the power supply station and unlockable when the electronic certification key is confirmed to be the authorized one by the electronic certification control section. The vehicle-side security control section or the station-side security control section is configured to detect whether the vehicle-side connector is connected to the station-side connector. The station-side security control section is configured to unlock the electrically-driven lock, when the vehicle-side security control section or the station-side security control section detects connection of the connectors and the electronic certification control section confirms that the electronic certification key is the authorized one at time of performing unlock manipulation on the electrically-driven lock provided at the power supply station or the electronic certification key for unlocking the foyer.

In a third aspect, the plug-in vehicle is provided with a vehicle-side power line communication section for performing power line communication with the power supply station through the power supply line, and a vehicle-side security control section connected to the vehicle-side power line communication section. The power supply station is provided with a station-side power line communication section for performing the power line communication with the plug-in vehicle through the power supply line, a station-side security control section connected to the station-side power line communication section. An electronic certification control section is provided in each of the power supply station and the plug-in vehicle for checking whether an electronic certification key for the plug-in vehicle is an authorized one. A vehicle anti-theft control section is provided in the vehicle for allowing starting of a vehicle drive motor or a hybrid engine only when the electronic certification control section confirms that the electronic certification key is the authorized one. The vehicle-side security control section and the station-side security control section are configured to cooperate to allow charging of the battery by the commercial power source through the power supply line, when the electronic certification control section of the power supply station confirms that the electronic certification key is the authorized one at time of detection of connection of the battery to the commercial power source by the vehicle-side security control section. The vehicle-side security control section and the station-side security control section are configured to cooperate to inhibit charging the battery by the commercial power source through the power supply line, when the electronic certification control section of the power supply station fails to confirm that the electronic certification key is the authorized one at time of detection of the connection of the battery to the commercial power source by the vehicle-side security control section. The vehicle-side security control section and the station-side security control section are configured to cooperate to inhibit starting the drive motor or the hybrid engine, when the electronic certification control section of the plug-in vehicle fails to confirm that the electronic certification key is the authorized one at time of detection of the disconnection by the vehicle-side security control section.

BRIEF DESCRIPTION OF THE DRAWINGS

The above and other objects, features and advantages of the present exemplary embodiment will become more apparent from the following detailed description made with reference to the accompanying drawings. In the drawings.

DETAILED DESCRIPTION OF THE PREFERRED EMBODIMENT

A plug-in vehicle management system will be described in detail with reference to exemplary preferred embodiments. In the following embodiments, a station is a power supply station, which includes a home, a building, a parking garage and the like, where a user of a plug-in vehicle is allowed to charge a storage battery of the plug-in vehicle by a commercial power source through an electric power supply line. The power supply line not only supplies AC voltage of a fixed frequency 50 Hz or 60 Hz but also transmits high frequency-modulated signal of minute voltage by superimposition on the AC voltage for power line communication through the power supply line. The high-frequency modulated signal includes data, which is transmitted from one side to the other side.

It is noted in the following embodiments that the same or similar sections and parts are designated by the same or similar reference numerals or signs, whereby the same or similar description need not be repeated.

(First Embodiment)

Figure 1:
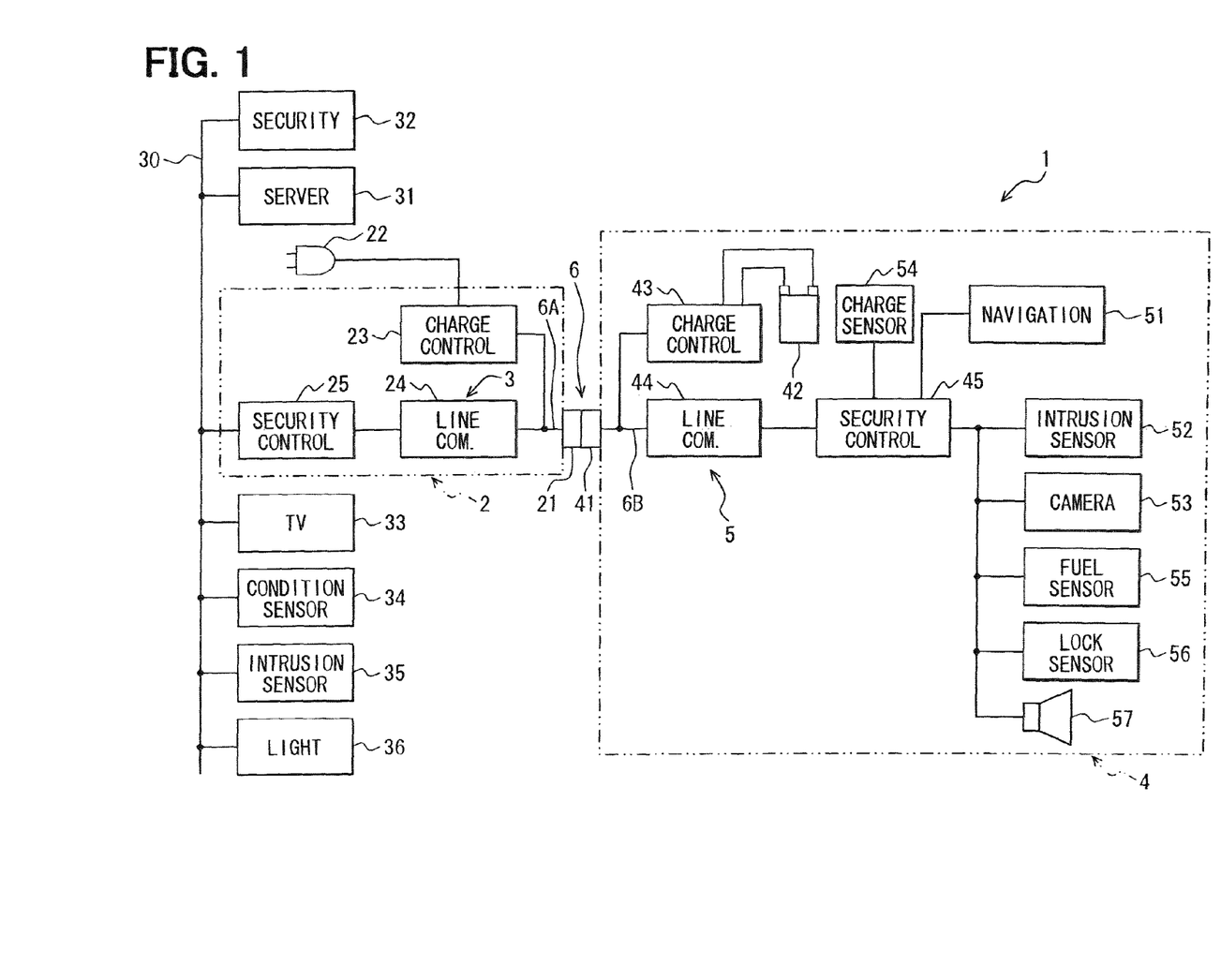
FIG. 1 is a block diagram of a plug-in vehicle management system according to a first embodiment of the present invention.

As shown in FIG. 1, a plug-in vehicle management system 1 is configured to enable charging of a plug-in vehicle 4 from an electric power supply station 2 through an electric power supply line 6 and power line communication between the power supply station 2 and the plug-in vehicle 4. The plug-in vehicle 4 includes a vehicle-side connector 41 provided at the connection section of a vehicle-side section 6B of the power supply line 6, a storage battery 42 configured to be charged from the power supply line 6, a vehicle-side power line communication section 44 for performing the power line communication with the power supply station 2 through the power supply line 6, and a vehicle-side security control section 45 for controlling a vehicle-side input/output section 5 provided in the plug-in vehicle 4 by the communication section 44 by way of the power line communication with the power supply station 2 by the vehicle-side power line communication section 44.

The power supply station 2 includes a station-side connector 21 provided at the connection section of a station-side section 6A of the power supply line 6 to be connected to the vehicle-side connector 41, a commercial power source 22 for supplying commercial electric voltage to the station-side section 6A of the power supply line 6, a station-side power line communication section 24 for performing power line communication with the plug-in vehicle 4 through power supply line 6, and a station-side security control section 25 for controlling a station-side input/output section 3 provided in the power supply station 2 by way of the power line communication with the plug-in vehicle 4 by the station-side power line communication section 24.

In this system 1, when the vehicle-side connector 41 is connected to the station-side connector 21 and the vehicle-side power line communication section 44 to enable the power line communication between the vehicle-side power line communication section 44 and the station-side power line communication section 24, the vehicle-side security control section 45 and the station-side security control section 25 cooperate to transmit input signals received at one of the station-side input/output section 3 and the vehicle-side input/output section 5 to the other of the station-side input/output section 3 and the vehicle-side input/output section 5. The cooperation of the vehicle-side security control section 45 and the station-side security control section 25 means mutual communication of data.

The plug-in vehicle management system 1 is further configured to enhance security of the plug-in vehicle 4 and the power supply station 2, as well as an application (additional function) of the plug-in vehicle 4 and the power supply station 2. The power supply line 6 is a power supply line of the commercial power source 22, which supplies AC voltage of 50 Hz or 60 Hz, and is configured to enable communication by way of the power line communication function of the station-side power line communication section 24 and the vehicle-side power line communication section 44. This communication is performed by superimposing a high frequency modulation signal of minute voltage on the power supply line 6.

In the power supply station 2, a station-side charge control section 23 is connected to the commercial power source 22 for controlling electric power and the like supplied to the plug-in vehicle 4 and connected to the station-side section 6A of the power supply line 6. The station-side power line communication section 24 is connected to the power supply line 6 at the power supply station 2. The station-side security control section 25 is connected to the station-side power line communication section 24. The station-side input/output section 3 is connected to the station-side security control section 25 through a home network (local area network communication line and the like). In the power supply station 2, a home server 31 is provided for controlling a network of a variety of devices (station-side input/output section 3) in a home network 30. The home server 31 may be formed by a personal computer or the like.

In the power supply station 2, a home security device 32, which operates in cooperation with a television set 33 and the like, is provided. A user of the plug-in vehicle 4 can thus perform various monitoring by using the vehicle-side input/output section 5 of the plug-in vehicle 4 by operating the home security device 32. Although the main control section of the power supply station 2 is enclosed by a two-dot chain line in FIG. 1, the power supply station 2 means the entire facility of a home.

In the plug-in vehicle 4, a vehicle-side charge control section 43 is connected to the vehicle-side power line section 6B of the power supply line 6 for controlling charging of the battery 42. The battery 42 is connected to the vehicle-side power line section 6B of the power supply line 6 at the plug-in vehicle 4 through the vehicle-side charge control section 43. The vehicle-side power line communication section 44 is connected to the vehicle-side power line section 6B of the power supply line 6. The vehicle-side security control section 45 is connected to the vehicle-side power line communication section 44. The vehicle-side input/output section 5 is connected to the vehicle-side security control section 45.

The vehicle-side input/output section 5 includes, as vehicle-side input devices, a vehicle intrusion sensor 52 provided at doors or the like of the plug-in vehicle 4, a camera 53 for taking pictures of at least one of the inside or the outside of the plug-in vehicle 4, a charge detection sensor 54 for detecting an amount of electric charge of the battery 42 of the plug-in vehicle 4, a fuel detection sensor 55 for detecting a remaining amount of fuel in the fuel tank of the plug-in vehicle 4, a lock detection sensor 56 for detecting door lock condition of the plug-in vehicle 4, and a car navigation system 51, which is provided as a control computer in the plug-in vehicle 4. The vehicle-side input/output section 5 also includes, as vehicle-side output devices, the car navigation system 51 provided in the plug-in vehicle 4 as a monitor system operable by a user and an alarm (horn) 57 provided in the plug-in vehicle 4.

The station-side input/output section 3 includes, as station-side input devices, a home condition sensor 34 and a station-side intrusion sensor 35. The condition sensor 34 detects a variety of conditions of the power supply station 2, such as gas supply main cock on/off condition, light on/off condition, foyer door lock on/off condition, window open/close or lock on/off condition and air-conditioner on/off condition. The intrusion sensor 35 detects intrusion at the foyer and windows of the power supply station 2. The station-side input/output section 3 also includes, as station-side input devices, the television set 33 provided as an image monitor in the power supply station 2 and lights 36 provided in the power supply station 2.

The plug-in vehicle management system 1 according to the first embodiment performs its control operation as follows.

When the plug-in vehicle 4 is parked by a user in the garage of the power supply station 2, for example, the vehicle-side connector 41 provided in the plug-in vehicle 4 is connected to the station-side connector 21 to electrically connect the plug-in vehicle 4 to the power supply station 2 through the power supply line 6. By control operation of the station-side charge control section 23 and the vehicle-side charge control section 43, the battery 42 of the plug-in vehicle 4 is charged by the commercial power source 22 through the power supply line 6. When the vehicle-side connector 41 is connected to the station-side connector 21, the power line communication through the power supply line 6 is enabled between the vehicle-side power line communication section 44 and the station-side power line communication section 24. By operation of the vehicle-side power line communication section 44 and the station-side power line communication section 24, the vehicle-side security control section 45 for controlling the vehicle-side input/output section 5 and the station-side security control section 25 for controlling the station-side input/output section 3 become cooperative.

Under the chargeable condition through the power supply line 6, various security operations in the plug-in vehicle 4 and the power supply station 2, as well as various applications (additional functions) relative to the plug-in vehicle 4 and the power supply station 2, can be realized by the cooperative operations of the vehicle-side security control section 45 and the station-side security control section 25.

Various security operations and application operations will be described below.

The plug-in vehicle management system 1 provides, as one of the security operations for the plug-in vehicle 4, monitoring an unauthorized manipulation on the plug-in vehicle 4. Specifically, when the intrusion sensor 52 provided at the doors or the like of the plug-in vehicle 4 detects an unauthorized operation on the vehicle 4, the vehicle-side security control section 45 controls the camera 53 of the plug-in vehicle 4 to photograph the inside compartment and the outside area of the vehicle 4. The vehicle-side security control section 45 and the station-side security control section 25 cooperate to display the images photographed by the camera 53 on the television set 33 used as the image display section in the power supply station 2 by transmitting the images outputted by the camera 53 (input/output section 4) of the plug-in vehicle 4 to the television set 33 (input/output section 3) of the power supply station through the power supply line 6. By thus using the power supply line 6, which is provided to charge the battery 42 by the commercial power source 22, an authorized user such as the owner of the plug-in vehicle 4 can check the compartment of the plug-in vehicle 4 when the unauthorized manipulation is performed on the plug-in vehicle 4 even if staying away from the plug-in vehicle 4 in the power supply station 2.

The plug-in vehicle management system 1 also provides another monitoring of the unauthorized manipulation on the plug-in vehicle 4 as one of the security operations for the plug-in vehicle 4.

Specifically, when the intrusion sensor 52 provided in the plug-in vehicle 4 detects an unauthorized manipulation on the vehicle 4, the vehicle-side security control section 45 and the station-side security control section 25 cooperate to activate all the lights 36 (or light 36 in the bedroom at night). By thus using the power supply line 6, which is provided to charge the battery 42 by the commercial power source 22, the authorized user of the plug-in vehicle 4 even if staying away from the plug-in vehicle 4 in the power supply station 22 can be notified of the unauthorized manipulation on the plug-in vehicle 4 in the simple manner.

The plug-in vehicle management system 1 provides, as one of the application operations for the plug-in vehicle 4, monitoring of the charge amount of the battery 42 of the plug-in vehicle 4.

Specifically, when the user of the plug-in vehicle 4 in the power supply station 2 manipulates the home security device 32, the vehicle-side security control section 45 and the station-side security control section 25 cooperate to display on the television set 33 in the power supply station 2 the charge amount detected by the charge detection sensor 54 of the plug-in vehicle 4. By thus using the power supply line 6, which is provided to charge the battery 42 by the commercial power source 22, the user of the plug-in vehicle 4 can check the charge amount of the battery 42 while staying away from the plug-in vehicle 4 in the power supply station 2.

The plug-in vehicle management system 1 further provides, as another one of the application operations for the plug-in vehicle 4, monitoring of the charge amount of the battery 42 of the plug-in vehicle 4.

Specifically, when the user of the plug-in vehicle 4 in the power supply station 2 manipulates the home security device 32, the vehicle-side security control section 45 and the station-side security control section 25 cooperate to display on the television set 33 in the power supply station 2 the amount of remaining fuel in the fuel tank detected by the fuel sensor 55. By thus using the power supply line 6, which is provided to charge the battery 42 by the commercial power source 22, the user of the plug-in vehicle 4 can check the amount of charge of the battery 42 while staying away from the plug-in vehicle 4 in the power supply station 2.

The plug-in vehicle management system 1 provides, as a further one of the application operations for the plug-in vehicle 4, monitoring of a door condition (door lock on/off condition) of the plug-in vehicle 4.

Specifically, when the user of the plug-in vehicle 4 in the power supply station 2 manipulates the home security device 32, the vehicle-side security control section 45 and the station-side security control section 25 cooperate to display on the television set 33 in the power supply station 2 the lock/unlock condition of the door detected by the lock detection sensor 56 provided at the door of the plug-in vehicle 4. By thus using the power supply line 6, which is provided to charge the battery 42 by the commercial power source 22, the user of the plug-in vehicle 4 can check the lock/unlock condition of the door of the vehicle while staying away from the plug-in vehicle 4 in the power supply station 2.

The plug-in vehicle management system 1 further provides, as a still further one of the application operations for the plug-in vehicle 4, monitoring of a variety of vehicle information (diagnosis information, etc.) of the plug-in vehicle 4.

Specifically, when the user of the plug-in vehicle 4 in the power supply station 2 manipulates the home security device 32, the vehicle-side security control section 45 and the station-side security control section 25 cooperate to display on the television set 33 in the power supply station 2 the vehicle information, which is managed by the car navigation system 51 provided in the plug-in vehicle 4. By thus using the power supply line 6, which is provided to charge the battery 42 by the commercial power source 22, the user of the plug-in vehicle 4 can check the vehicle information of the plug-in vehicle 4 while staying away from the plug-in vehicle 4 in the power supply station 2.

The plug-in vehicle management system 1 further provides, as a still further one of the application operations for the plug-in vehicle 4, monitoring of the inside and the outside of the plug-in vehicle 4.

Specifically, when the user of the plug-in vehicle 4 in the power supply station 2 manipulates the home security device 32, the vehicle-side security control section 45 and the station-side security control section 25 cooperate to display on the television set 33 in the power supply station 2 the images photographed by the camera 53. By thus using the power supply line 6, which is provided to charge the battery 42 by the commercial power source 22, the user of the plug-in vehicle 4 can check the inside condition and the outside condition of the plug-in vehicle 4 while staying away from the plug-in vehicle 4 in the power supply station 2. For example, it can be checked whether it is raining outside the power supply station 2.

The plug-in vehicle management system 1 further provides, as one of the application operations for the power supply station 2, monitoring of various condition such as utility, door lock and the like of the power supply station 2. Specifically, when the user of the plug-in vehicle 4 manipulates the car navigation system 51 in the plug-in vehicle 4, the vehicle-side security control section 45 and the station-side security control section 25 cooperate to display on the display section of the car navigation system 51 the power supply station conditions. The power supply station conditions include gas supply main cock on/off condition, the light on/off condition, the foyer door lock on/off condition, the window open/close or lock on/off condition, the air-conditioner on/off condition and the like. By thus using the power supply line 6, which is provided to charge the battery 42 by the commercial power source 22, the user of the plug-in vehicle 4 can check various conditions of the power supply station 2 while staying in the plug-in vehicle 4.

The plug-in vehicle management system 1 further provides, as another one of the application operations for the power supply station 2, monitoring of intrusion into the power supply station 2.

Specifically, when any intrusion into the power supply station 2, particularly home, from the outside is detected by the intrusion sensor 35 provided at locations such as the foyer or the windows of the power supply station 2, the vehicle-side security control section 45 and the station-side security control section 25 cooperate to activate the alarm 57 (horn) of the plug-in vehicle 4. By thus using the power supply line 6, which is provided to charge the battery 42 by the commercial power source 22, as well as the alarm 57 of the plug-in vehicle 4, the unauthorized manipulation performed on the foyer or the windows of the power supply station 2 is notified by sound in the plug-in vehicle 4 or its surrounding area.

The plug-in vehicle management system 1 according to the first embodiment thus enhances the security of both the plug-in vehicle 4 and the power supply station 2 and enhances applications (additional functions) for both the plug-in vehicle 4 and the power supply station 2.

(Second Embodiment)

Figure 2:
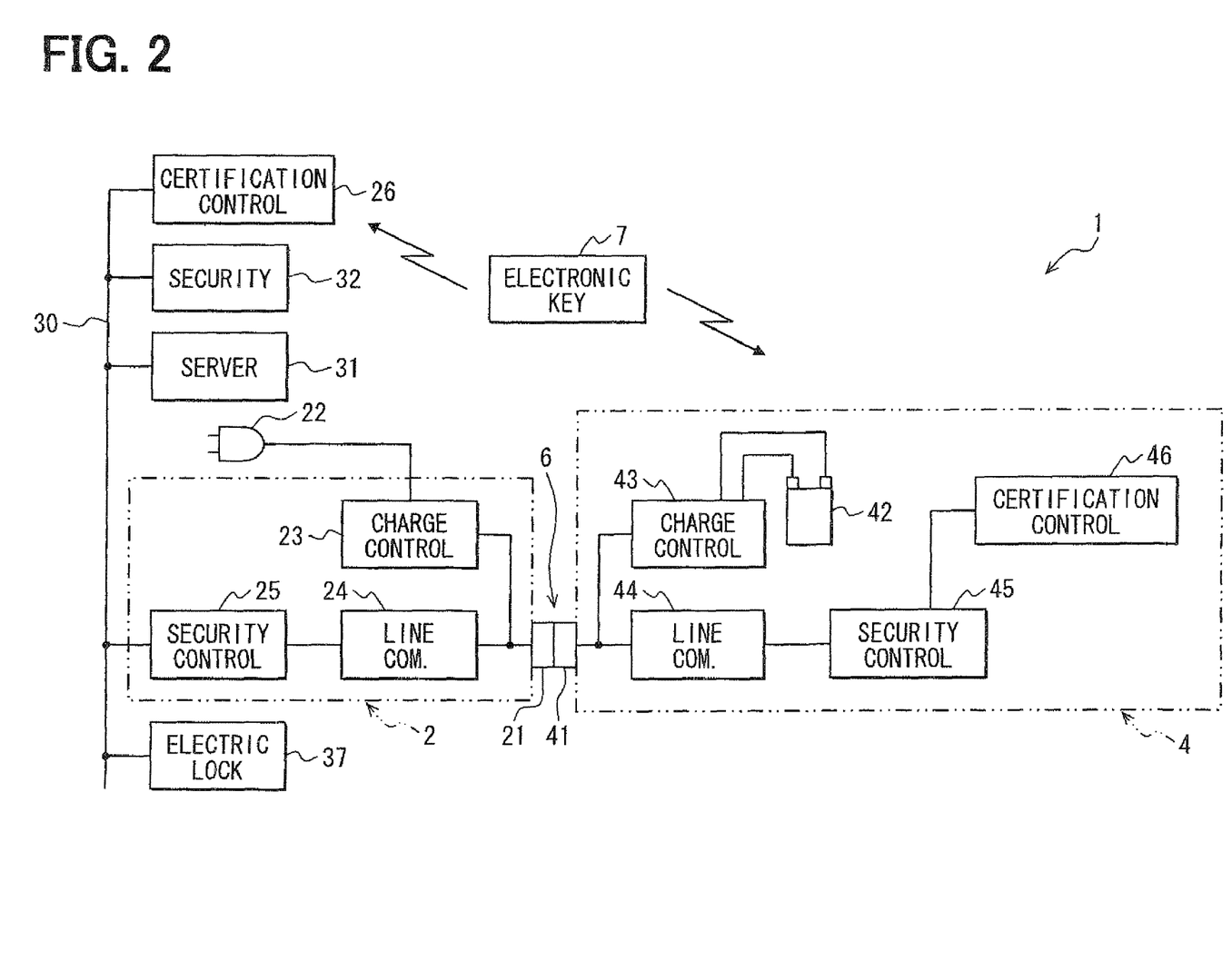
FIG. 2 is a block diagram of a plug-in vehicle management system according to a second embodiment of the present invention.

In the second embodiment, the application of unlocking the foyer of the power supply station 2 performed by using the function of an electronic certification key 7 of the plug-in vehicle 4 is enhanced, assuming that the battery 42 of the plug-in vehicle 4 is chargeable by the commercial power source 22.

As shown in FIG. 2, the plug-in vehicle 4 is provided with the electronic certification key 7 so that doors of the plug-in vehicle 4 are locked and unlocked by performing electronic certification of data. An electronic certification section 26 is provided at the foyer of the power supply station 2 for checking whether the electronic certification key 7 is an authorized key, that is whether the authorized electronic key is present. The foyer lock is an electrically-driven lock 37, which is unlocked when the control section 26 determines that the electronic certification key 7 is the authorized one. An electronic certification control section 46 is provided in the plug-in vehicle 4. The electronic certification key 7 is referred to as a smart entry intelligent key in some instances. The vehicle-side security control section 45 and the station-side security control section 25 are configured to be able to detect connection of the vehicle-side connector 41 to the station-side connector 21.

The plug-in vehicle management system 1 is configured to detect the connection of each connector by the vehicle-side security control section 45 or the station-side security control section 25, when the foyer of the power supply station 2 is unlocked by the unlocking manipulation on the electrically-driven lock 37 or the unlocking manipulation of the electronic certification key 7. The plug-in vehicle management system 1 is configured to unlock the electrically-driven lock 37 of the power supply station 2, when the electronic certification section 26 determines that the electronic certification key 7 is the authorized one.

The plug-in vehicle management system 1 is further configured to automatically notify a security company or the user of the plug-in vehicle 4 of unauthorized unlocking manipulation on the electrically-driven lock 37 as an intrusion alarm processing, when the unauthorized unlocking manipulation is repeated.

Figure 3:
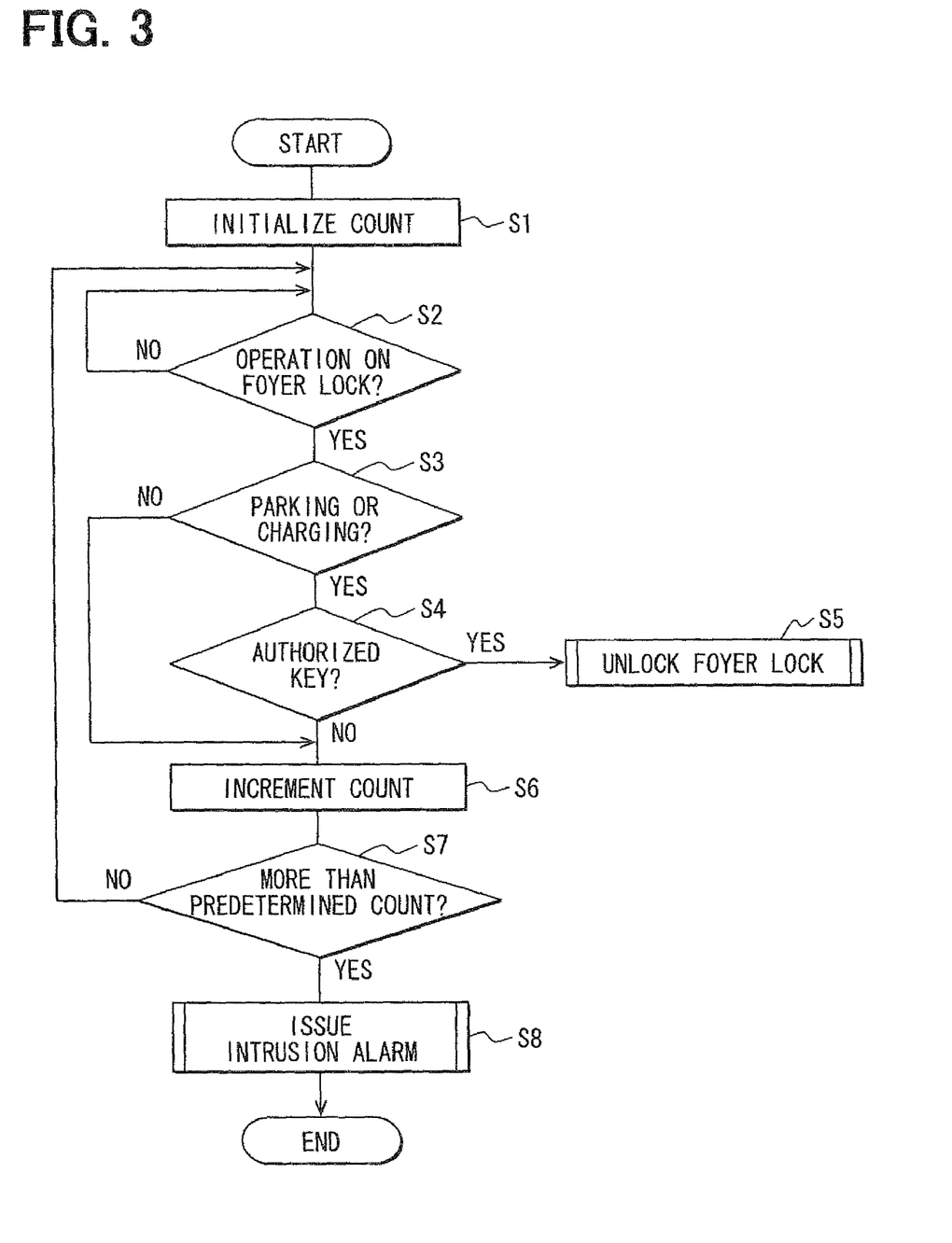
FIG. 3 is a flowchart of control processing performed in the second embodiment.

The control operation of the plug-in vehicle management system 1 is described in detail with reference to the flowchart shown in FIG. 3, When this control processing is started in the control system 1, a count indicating the number of times of unauthorized unlocking manipulation on the foyer lock, is initialized first (step S1). It is checked next (step S2) whether unlocking manipulation has been performed on the electrically-driven lock 37 provided at the power supply station 2 by an unlock key or the electronic certification key 7. If the unlocking manipulation has been confirmed, it is checked (step S3) whether the plug-in vehicle 4 is being parked or charged. This may be checked depending on whether the connection of each connector is detected by the vehicle-side security control section 45 or the station-side security control section 25. If no connection is detected, it is determined that the plug-in vehicle 4 is not parked at the power supply station 2 or not charged by the commercial power source 22. This situation will indicate a possibility that an unauthorized person, who is not the user of the plug-in vehicle 4 or the owner of the power supply station 2, is trying to intrude upon the power supply station 2. In this case, the count is incremented (step S6) as the unauthorized unlocking manipulation on the foyer of the power supply station 2.

If the connection of the connectors 21 and 41 is detected, that is, the plug-in vehicle 4 is parked or charged, it is checked (step S4) by the electronic certification section 26 whether the electronic certification key 7 is the authorized one. This check may be performed by checking whether the electronic certification key 7, which is authorized, is present within a predetermined detection area. If it is determined that the authorized electronic key 7 is present, the electrically-driven lock 37 of the foyer is automatically unlocked (step S5). If it is determined that the authorized electronic key 7 is not present, the count is incremented (step S6) as the unauthorized unlocking manipulation on the foyer of the power supply station 2. If the count reaches or exceeds a predetermined number (step S7), it is determined that the unauthorized unlocking manipulation has been repeated more than the predetermined number of times, an intrusion alarm is issued (step S8).

According to the second embodiment, the foyer lock (electrically-driven lock 37) is allowed to be unlocked, only when the vehicle 4 is being charged in the power supply station 2 and the user carries the electronic certification key 7. That is, the foyer lock is not allowed to be unlocked, when the plug-in vehicle 4 is not being charged or the user does not carry the electronic certification key 7 at the time of performing the unlocking manipulation on the foyer lock (unlocking manipulation by the unlocking key provided in the power supply station 2 or by the electronic certification key 7). As a result, according to the plug-in vehicle management system 1 of the second embodiment, the application (additional function) for the power supply station 2 such as a home and the like can be enhanced.

According to the second embodiment, the power line communication between the vehicle-side power line communication section 44 and the station-side power line communication section 24 through the power supply line 6 is enabled when the vehicle-side connector 41 of the plug-in vehicle 4 is connected to the station-side connector 21 of the power supply station 2. Further, the cooperative operation between the vehicle-side security control section 45 for controlling the vehicle-side input/output section 5 and the station-side security control section 25 for controlling the station-side input/output section 3 is enabled by the vehicle-side power line communication section. 44 and the station-side power line communication section 24.

(Third Embodiment)

In the third embodiment, the application for the power supply station 2 is enhanced as well relative to the plug-in vehicle management system 1 described as the second embodiment.

Figure 4:
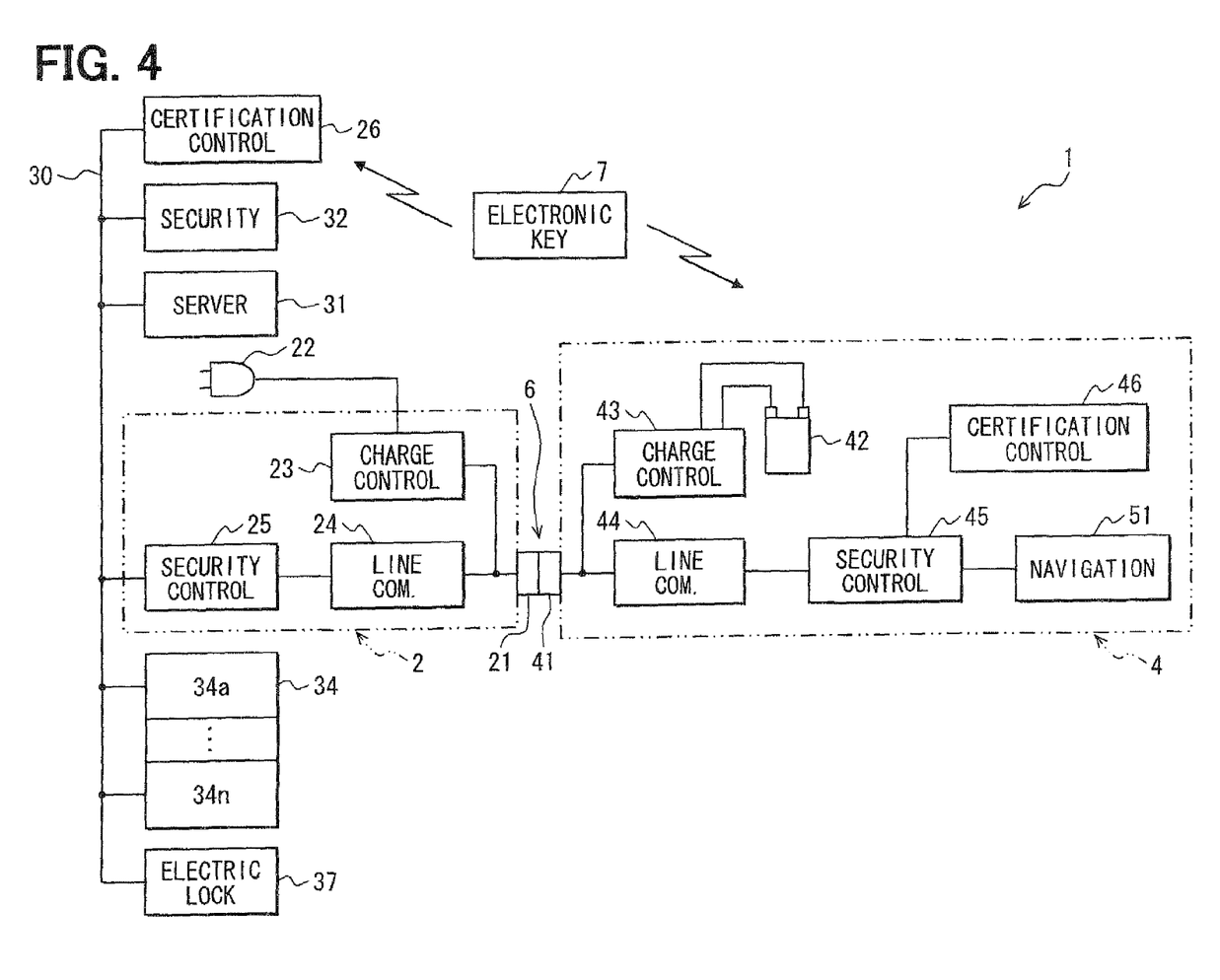
FIG. 4 is a block diagram of a plug-in vehicle management system according to a third embodiment of the present invention.

As shown in FIG. 4, a plurality of condition sensors 34a to 34n (referred to the condition sensor 34 collectively) are provided in correspondence to various conditions of the power supply station 2 such as the gas supply main cock on/off condition, light on/off condition, foyer lock on/off condition, window open/close or lock on/off condition and air-conditioner on/off condition. The car navigation system 51 in the vehicle 4 is configured to display on its display section various conditions of the power supply station 2 detected by the condition sensor 34.

In the plug-in vehicle management system 1, under the condition that the battery 42 of the plug-in vehicle 4 is charged after the vehicle-side security control section 45 or the station-side security control section 25 has detected the connection of each connector 21, 41, the condition sensor 34 provided in the power supply station 2 detects the power supply station condition when the vehicle-side security control section 45 or the station-side security control section 25 detects disconnection of each connector 21, 41.

The vehicle-side security control section 45 and the station-side security control section 25 cooperate to display on the display section of the car navigation system 51 in the plug-in vehicle 4 the power supply station condition detected by the condition sensor 34. If the power supply station condition has an abnormality, the car navigation system 51 operates to issue an alarm of such abnormality to the user in the vehicle 4. The cooperation of the vehicle-side security control section 45 and the station-side security control section 25 is enabled by the mutual data communication to each other.

When the vehicle-side connector 41 is pulled out from the station-side connector 21 for travel of the plug-in vehicle 4, the user can check in the plug-in vehicle 4 the power supply station condition including the gas supply main cock on/off condition, light on/off condition, foyer lock on/off condition, window open/close or lock on/off condition and air-conditioner on/off condition at the time of leaving the power supply station 2. Thus, the plug-in vehicle management system 1 can further enhance the application for the power supply station 2.

(Fourth Embodiment)

Figure 5:
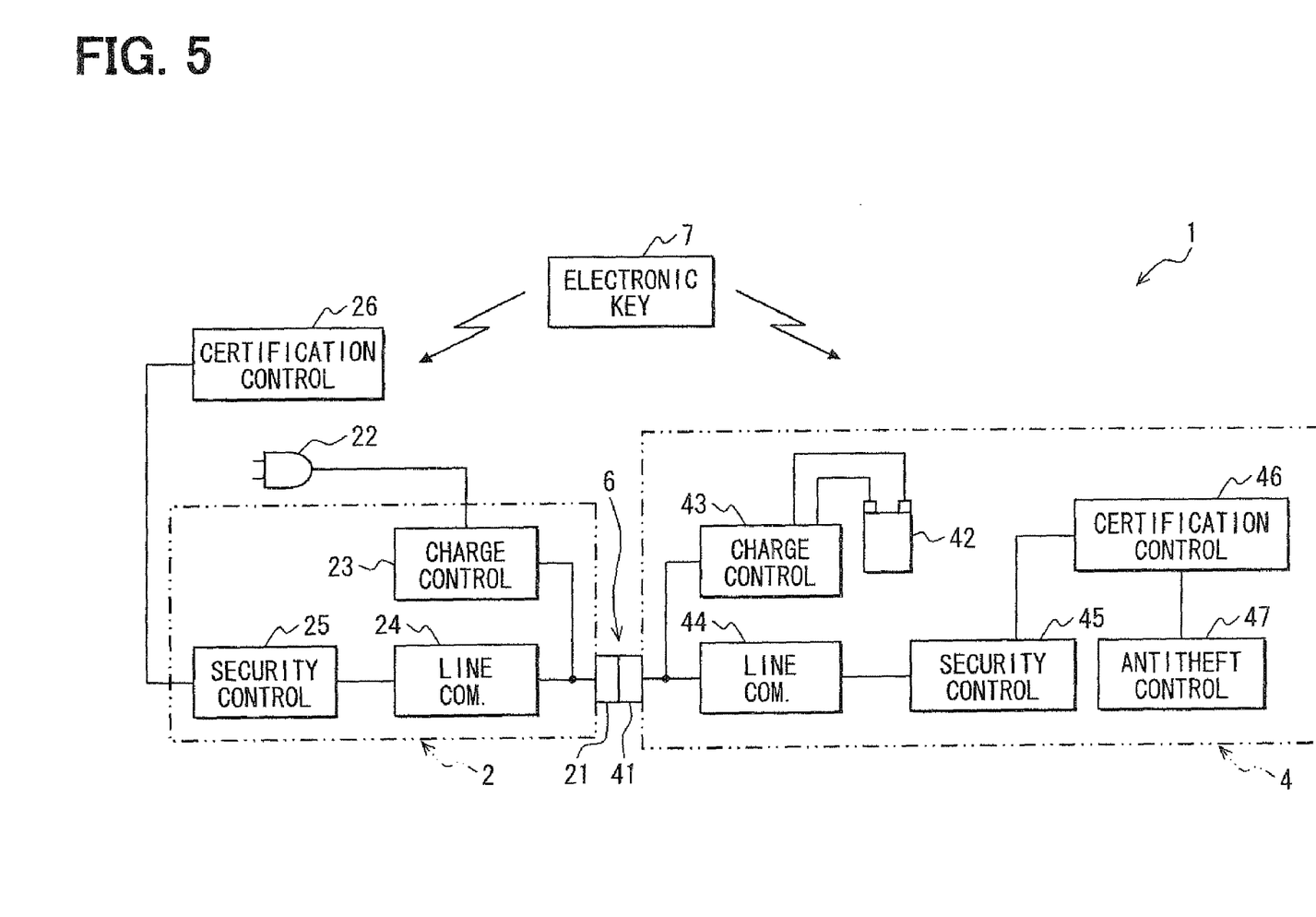
FIG. 5 is a block diagram of a plug-in vehicle management system according to a fourth embodiment of the present invention.

In the fourth embodiment, security in case of charging the battery 42 is enhanced by using the electronic certification key 7 provided for the plug-in vehicle 4 and the connector condition (connection and disconnection) detection function provided in the vehicle-side security control section 45.

As shown in FIG. 5, the electronic certification key 7 is provided for the plug-in vehicle 4 to lock and unlock the doors of the plug-in vehicle 4 by the electronic certification of ID. The plug-in vehicle 4 and the power supply station 2 are provided with respective certification control sections 46 and 26 for checking whether the electronic certification key 7 is the authorized one, respectively. The vehicle 4 is provided with a vehicle anti-theft control section 47, which is configured to allow starting of a vehicle drive motor or a hybrid-engine in the plug-in vehicle 4 only when the electronic certification section 26 in the power supply station 2 has confirmed that the electronic certification key 7 is the authorized one. The vehicle-side security control section 45 is configured to detect the connection of the vehicle-side connector 41 to the station-side connector 21 as well as the disconnection of the vehicle-side connector 41 from the station-side connector 21.

In the plug-in vehicle management system 1, when the electronic certification section 26 in the power supply station 2 confirms that the electronic certification key 7 is the authorized one under the condition that the connection of the connectors 21, 41 is detected by the vehicle-side security control section 45, the vehicle-side security control section 45 and the station-side security control section 25 cooperate to perform charging of the battery 42 of the plug-in vehicle 4 by the commercial power source 22 through the power supply line 6. When the electronic certification section 26 in the power supply station 2 does not confirm that the electronic certification key 7 is the authorized one under the condition that the connection of the connectors 21, 41 is detected by the vehicle-side security control section 45, the vehicle-side security control section 45 and the station-side security control section 25 cooperate to disable charging of the battery 42 of the plug-in vehicle 4 by the commercial power source 22 through the power supply line 6. Further, in the plug-in vehicle management system 1, when the section 46 in the vehicle 46 does not confirm that the electronic certification key 7 is the authorized one under the condition that the vehicle-side security control section 45 detects the disconnection of the connectors 21, 41, the vehicle anti-theft control section 47 operates to inhibit the starting of the drive motor or the hybrid engine.

According to the fourth embodiment, depending on whether the electronic certification section 26 in the power supply station 2 detects that the electronic certification key 7 is the authorized one under the condition that the connector connection is detected by the vehicle-side security control section 45, the vehicle-side security control section 45 and the station-side security control section 25 cooperate to determine whether to allow or inhibit the charging of the battery 42 by the commercial power source 22. When the electronic certification section 26 in the power supply station 2 does not detect presence of the authorized electronic certification key 7, the charging of the battery 42 by the commercial power source 22 is inhibited. As a result, the charging of the battery 42 is allowed only when the authorized user of the power supply station 2 and the plug-in vehicle 4 connects the vehicle-side connector 41 to the station-side connector 21. Thus, unauthorized consumption of the electric power from the station-side connector 21 is prevented. The station-side security control section 25 may be configured to transmit the inhibition of the charging to a mobile terminal such as a cell phone of the authorized user, when the charging is inhibited or the presence of the electronic certification key 7 is not detected.

Further, since the vehicle anti-theft control section 47 disables the starting of the drive motor or the hybrid engine of the plug-in vehicle 4, the plug-in vehicle 4 is disabled to travel when the vehicle-side connector 41 is pulled out of the station-side connector 21 a third person other than the authorized user. Thus, the plug-in vehicle 4 is protected from theft. Thus, the plug-in vehicle management system 1 can enhance the security of the vehicle 4 and the power supply station 2.

The present invention is not limited to the disclosed embodiments, but may be implemented in other ways. For example, each of the embodiments may be combined with the other one or more of the embodiments.

What is claimed is:

1. A plug-in vehicle management system, which performs charging of a plug-in vehicle by a power supply station through a power supply line, the plug-in vehicle management system comprising:
    a vehicle-side connector provided at a vehicle-side part of the power supply line;
    a battery provided in the plug-in vehicle to be charged through the power supply line;
    a station-side connector provided at a station-side part of the power supply line and connectable to the vehicle side connector;
    a commercial power source connection for supplying the station-side part of the power supply line with commercial voltage;
    a vehicle-side power line communication section provided in the plug-in vehicle for performing power line communication with the power supply station through the power supply line;
    a vehicle-side security control section provided in the plug-in vehicle and connected to the vehicle-side power line communication section;
    a station-side power line communication section provided in the power supply station for performing the power line communication with the plug-in vehicle through the power supply line;
    a station-side security control section provided in the power supply station and connected to the station-side power line communication section;
    an electronic certification key provided for the vehicle for locking and unlocking a door of the plug-in vehicle based on successfully performing electronic certification thereof;
    an electronic certification control section provided at a foyer of the power supply station for checking (a) whether a predetermined user unlocking manipulation has been performed and (b) whether the electronic certification key is an authorized one; and
    an electrically-driven lock provided at the foyer of the power supply station and unlockable when the electronic certification key is confirmed to be the authorized one by the electronic certification control section,
    wherein at least one of the vehicle-side security control section and the station-side security control section is configured to detect whether the vehicle-side connector is connected to the station-side connector, and
    wherein the station-side security control section is configured to unlock the electrically-driven lock, when (a) the vehicle-side security control section or the station-side security control section detects connection of the connectors and (b) the electronic certification control section confirms that the electronic certification key is the authorized one and (c) the predetermined user unlock manipulation has been performed on the electrically-driven lock provided at the power supply station or the electronic certification key for unlocking the foyer.

2. The plug-in vehicle management system according to claim 1, further comprising:
    a condition sensor for detecting a station condition, which includes at least one of gas supply main cock condition, light condition, foyer condition, window condition, and air-conditioner condition in the power supply station,
    wherein the vehicle-side security control section or the station-side security control section is configured to detect disconnection of the vehicle-side connector from the station-side connector, and wherein the condition sensor is configured to detect the power supply station condition when the disconnection is detected by the vehicle-side security control section or the station-side security control section.

3. A plug-in vehicle management system, which performs charging of a plug-in vehicle by a power supply station through a power supply line, the plug-in vehicle management system comprising:
- a vehicle-side connector provided at a vehicle-side part of the power supply line;
- a battery provided in the plug-in vehicle to be charged through the power supply line;
- a station-side connector provided at a station-side part of the power supply line and connectable to the vehicle side connector;
- a commercial power source connection for supplying the station-side part of the power supply line with commercial voltage;
- a vehicle-side power line communication section provided in the plug-in vehicle for performing power line communication with the power supply station through the power supply line;
- a vehicle-side security control section provided in the plug-in vehicle and connected to the vehicle-side power line communication section;
- a station-side power line communication section provided in the power supply station for performing the power line communication with the plug-in vehicle through the power supply line;
- a station-side security control section provided in the power supply station and connected to the station-side power line communication section;
- an electronic certification key provided for the vehicle for locking and unlocking a door of the plug-in vehicle based on successfully performing electronic certification thereof;
- an electronic certification control section provided in each of the power supply station and the plug-in vehicle for checking whether the electronic certification key is an authorized one; and
- a vehicle anti-theft control section provided in the vehicle for allowing starting of a vehicle drive motor or a hybrid engine only when the electronic certification control section confirms that the electronic certification key is the authorized one, wherein the vehicle-side security control section is configured to detect connection of the vehicle-side connector to the station-side connector and disconnection of the vehicle-side connector from the station-side connector, wherein the vehicle-side security control section and the station-side security control section are configured to cooperate to allow charging of the battery by the commercial power source through the power supply line, when the electronic certification control section of the power supply station confirms that the electronic certification key is the authorized one at a time when connection by the vehicle-side security control section is detected, wherein the vehicle-side security control section and the station-side security control section are configured to cooperate to inhibit charging the battery by the commercial power source through the power supply line, when the electronic certification control section of the power supply station fails to confirm that the electronic certification key is the authorized one at a time when connection by the vehicle-side security control section is detected, and wherein the vehicle-side security control section and the station-side security control section are configured to cooperate to inhibit starting a drive motor or hybrid engine, when the electronic certification control section of the plug-in vehicle fails to confirm that the electronic certification key is the authorized one when disconnection by the vehicle-side security control section is detected.

* * * * *